United States Patent
McMiller et al.

(10) Patent No.: US 7,109,831 B2
(45) Date of Patent: Sep. 19, 2006

(54) SYSTEM AND METHOD FOR A REMOVABLE TUNER MODULE

(75) Inventors: Daniel F. McMiller, Cardiff By The Sea, CA (US); William R. Doyle, San Diego, CA (US); Nasila Edalatdju, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 156 days.

(21) Appl. No.: 10/853,316

(22) Filed: May 25, 2004

(65) Prior Publication Data

US 2005/0264382 A1    Dec. 1, 2005

(51) Int. Cl.
    *H05K 5/02*    (2006.01)
(52) U.S. Cl. .................... 334/88; 361/731; 361/732; 361/726; 361/727
(58) Field of Classification Search .................. 334/88; 361/731, 732, 725–727
    See application file for complete search history.

(56) References Cited

U.S. PATENT DOCUMENTS

| 6,154,633 | A | 11/2000 | Landgraf et al. | |
| 6,535,390 | B1* | 3/2003 | Lo | 361/726 |
| 6,556,445 | B1* | 4/2003 | Medina | 361/728 |

* cited by examiner

*Primary Examiner*—Benny Lee
(74) *Attorney, Agent, or Firm*—Benjamin D. Driscoll (57) ABSTRACT

A radio frequency (RF) tuner includes a housing, a cantilever snap formed in the housing, the cantilever snap being configured to securely couple the housing to a consumer premise component, and a handle formed on an edge of the housing.

25 Claims, 6 Drawing Sheets

SYSTEM AND METHOD FOR A REMOVABLE TUNER MODULE

FIELD

The present system and method relate to cable tuners. More particularly, the present system and method provide a system and a method for forming a tuner module that is installable and removable from a consumer premise component without the use of tools.

BACKGROUND

The television (TV) has become ubiquitous in modern society. As a result, a variety of services are being provided via TV. Many of these services are provided using a consumer premise component such as a set-top box that works in conjunction with the TV to provide the desired service. These consumer premise components enable standard television sets to receive video and/or audio signals transmitted over cable or satellite networks.

In conjunction with providing desired audiovisual services to consumers, consumer premise components also aid in maintaining a secure connection between the consumer and a transmitting entity by providing a descrambler or decoder unit, which unscrambles or decodes a signal carrying the desired programming. Unauthorized parties who do not have the consumer premise component will be unable to receive the audiovisual programming in an intelligible form.

However, the elements of the consumer premise components may readily become obsolete for a variety of reasons such as changing methods of encoding or the addition of new features and functions. Traditionally, the above-mentioned situations were remedied by providing authorized subscribers with a new consumer premise component containing an updated tuner/decoder unit designed to fully receive and translate the audiovisual programming signals transmitted by the signal provider. However, this solution is both expensive and time consuming, especially if authorized subscribers are widely spread over a large geographic region.

Alternatively, recent methods for solving the obsolescence of the elements of the consumer premise component have included manufacturing the consumer premise components to accept upgrade modules. While this method often eliminates the need for providing consumers with updated decoders, traditional upgrade modules have required specialized tools to perform the installation. Consequently, traditional upgrade modules have necessitated installation by a specialized installation/repair person performing a temporally expensive and inefficient house call.

SUMMARY OF THE INVENTION

A radio frequency (RF) tuner includes a housing, a cantilever snap formed in the housing, the cantilever snap being configured to securely couple the housing to a consumer premise component, and a handle formed on an edge of the housing.

BRIEF DESCRIPTION OF THE DRAWINGS

The accompanying drawings illustrate various embodiments of the present system and method and are a part of the specification. Together with the following description, the drawings demonstrate and explain the principles of the present system and method. The illustrated embodiments are merely examples of the present system and method and in no way limit the scope thereof.

Throughout the drawings, identical reference numbers designate similar, but not necessarily identical, elements and may not be described in detail in all of the drawing figures.

DETAILED DESCRIPTION OF THE INVENTION

The present specification describes a number of exemplary methods and systems for forming a user installable/removable tuner module. More specifically, the present system and method provide an upgrade tuner module housing that includes a cantilevered latch. The cantilevered latch allows an installation of the upgrade tuner module by a consumer without the aid of tools. The individual components and methods of using the user installable/removable tuner module are described in detail below.

As used in the present specification and in the appended claims, the term "consumer premise component" or "CPC" is meant to be understood broadly as including any set-top box, satellite receiver, lightweight modular display system (LMDS), multimedia display system (MMDS), or any IRD (integrated receiver/decoder). Additionally, "audiovisual programming" or "audiovisual signal" includes video and audio signals, whether transmitted alone or in combination as well as data, games (or other programs), graphics, control, telephony, text or other information independent of format.

A "set-top box" or "STB" is meant to be understood broadly as any electrical component that is configured to be located at a consumer location, receive a signal from a signal transmission source such as a satellite head-end unit, a cable head-end unit, and/or terrestrial signals from local broadcasts, and process data associated with the received signal. One example of a set-top box is an "integrated receiver decoder" or "IRD."

In the following description, for purposes of explanation, numerous specific details are set forth in order to provide a thorough understanding of the present system and method for forming a removable upgrade tuner module. It will be apparent, however, to one skilled in the art that the present system and method may be practiced without these specific details. Reference in the specification to "one embodiment," "an embodiment," or "an exemplary embodiment" means that a particular feature, structure, or characteristic described in connection with the embodiment is included in at least one embodiment. The phrases "in one embodiment" and "in an exemplary embodiment" appear in various places in the specification and are not necessarily all referring to the same embodiment.

Exemplary Overall Structure

Figure 1:
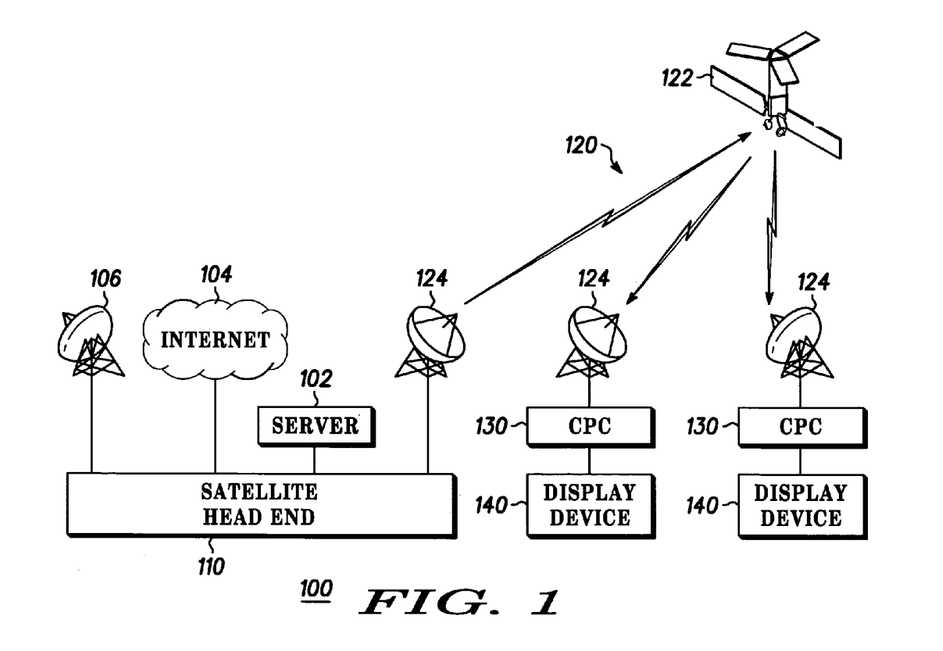
FIG. 1 is a simple block diagram illustrating a satellite television network with a tree-and-branch architecture, according to one exemplary embodiment.

Referring now to the drawings, FIG. 1 illustrates a satellite television network (100) with a tree-and-branch architecture according to one exemplary embodiment. As shown in FIG. 1, the satellite television network (100) includes a satellite headend unit (110). Also shown in FIG. 1, a number of data sources (102, 104, 106) may be communicatively coupled to the satellite headend unit (110) including, but in no way limited to, a plurality of servers (102), the Internet (104), radio signals, or television signals received via a satellite connection (106). The satellite headend (110) is also communicatively coupled to one or more consumer premise components or CPC (130) through a satellite broadcast network (120). The consumer premise component (130) may then be coupled to a display device (140).

As shown in FIG. 1, the satellite headend (110) is coupled to a number of data sources (102, 104, 106). The satellite headend (110) illustrated in the exemplary embodiment shown in FIG. 1 may be any centralized facility or a system at a satellite TV office that originates and communicates satellite TV services and/or satellite modem services to subscribers. The satellite TV services and/or satellite modem services may be received by the satellite headend (110) from any number of sources including those listed above. Once received in the satellite headend (110), the TV services and/or satellite modem services are encoded to eliminate redundant or irrelevant data, and information is extrapolated to reduce the overall size of the files providing the services. The TV services and/or satellite modem services are also encrypted prior to transmission to prevent unauthorized access to the signals.

The satellite broadcast network (120) illustrated in FIG. 1 is the medium over which the RF signals produced by the satellite headend unit (110) or by a CPC (130) are transmitted. The satellite broadcast network (120) may be any medium configured to transmit RF signals including, but in no way limited to, a satellite (122) to dish (124) network, a coaxial cable network, a fiber optic cable network, a local terrestrial or wireless network, or a hybrid cable network.

Figure 2:
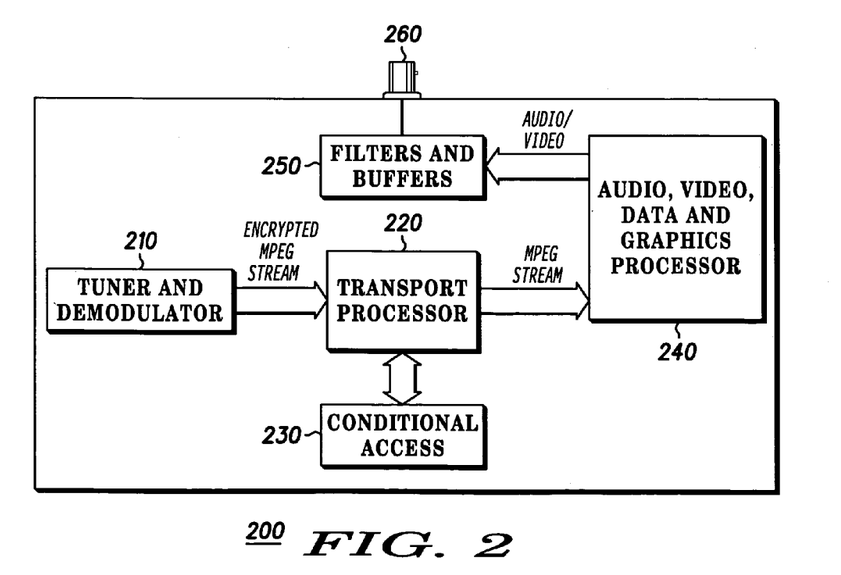
FIG. 2 is a simple block diagram illustrating the components of a traditional integrated receiver decoder, according to one exemplary embodiment.

Once transmitted through the satellite broadcast network (120), a downstream signal is received by a designated consumer premise component (CPC) (130). FIG. 2 illustrates the internal components of a CPC (130) according to the exemplary embodiment shown in FIG. 1. As shown in FIG. 2, a GPC in the form of an integrated receiver decoder (200) includes a tuner and demodulator (210) communicatively coupling an encrypted MPEG stream to a transport processor (220). The transport processor (220) is in turn communicatively coupled to a media access control unit (conditional access device) (230) and an coupling the MPEG stream to audio, video, data, and graphics processor (240). The audio, video, data, and graphics processor (240) then couples audio/video to a number of filters and buffers (250) which lead to a signal out connection (260) that may then be communicatively coupled to an external display device (140; FIG. 1).

Figure 3:
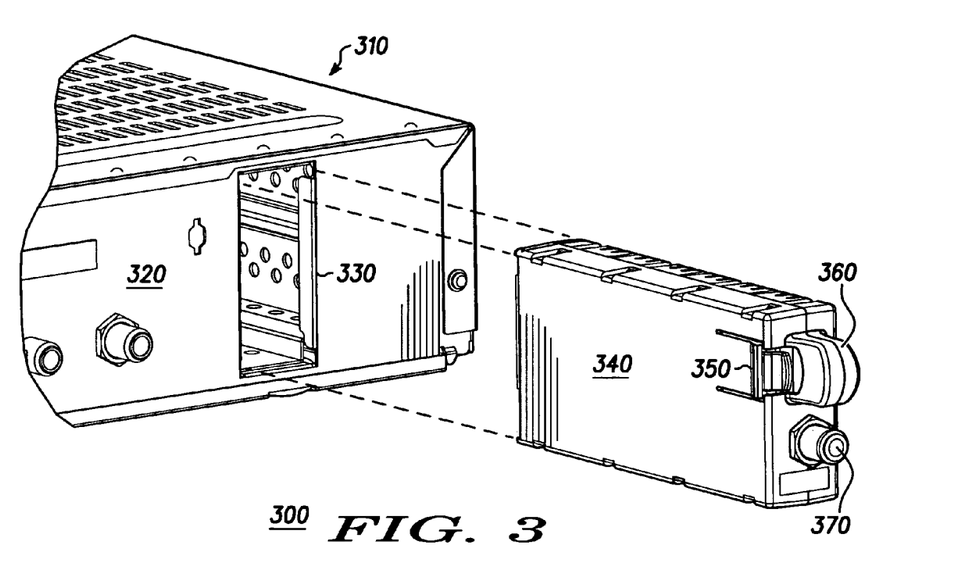
FIG. 3 is a perspective view of an upgradeable consumer premise component, according to one exemplary embodiment.

As noted above, the internal components of the CPC (130; FIG. 1), such as the tuner and demodulator (210), may become outdated or useless due to any number of conditions. Consequently, upgradeable consumer premise components configured to receive upgrade modules have been developed. As illustrated in FIG. 3, the upgradeable consumer premise component (300) includes a CPC chassis (310) having a back plate (320) and a module port (330) disposed within the back plate. Additionally, a removable upgrade module (340) is included in FIG. 3.

Traditionally, the removable upgrade modules (340) associated with upgradeable consumer premise components included a casing made out of a metal or another conductive material and a number of external fasteners configured to securely couple the removable upgrade module (340) to the components of the upgradeable CPC (300). Additionally, traditional removable upgrade modules often require the removal of the CPC chassis (310) to access the internal components of the CPC. However, the use of the external fasteners, as well as the need to access the internal components of the upgradeable CPC resulted in relegating the insertion of a removable upgrade module (340) to a service person having access to a number of specialized tools.

In contrast to traditional upgrade modules (340), the removable upgrade module (340) illustrated in FIG. 3 includes a cantilever snap (350) formed in the housing and the handle (360) of the removable upgrade module (340). The cantilever snap (350) formed in the housing and the handle (360) of the removable upgrade module (340) is configured to effectively secure the removable upgrade module (340) in the module port (330) without the use of extra hardware or complicated consumer installation, as will be developed in further detail below. Moreover, as illustrated in FIG. 3, the removable upgrade module (340) includes an F-connector (370) extruding from the housing of the removable upgrade module. The cantilever snap (350), the handle (360), and other individual elements of the removable upgrade module (340) will be described in further detail below with reference to FIGS. 4 through 10.

Figure 4:
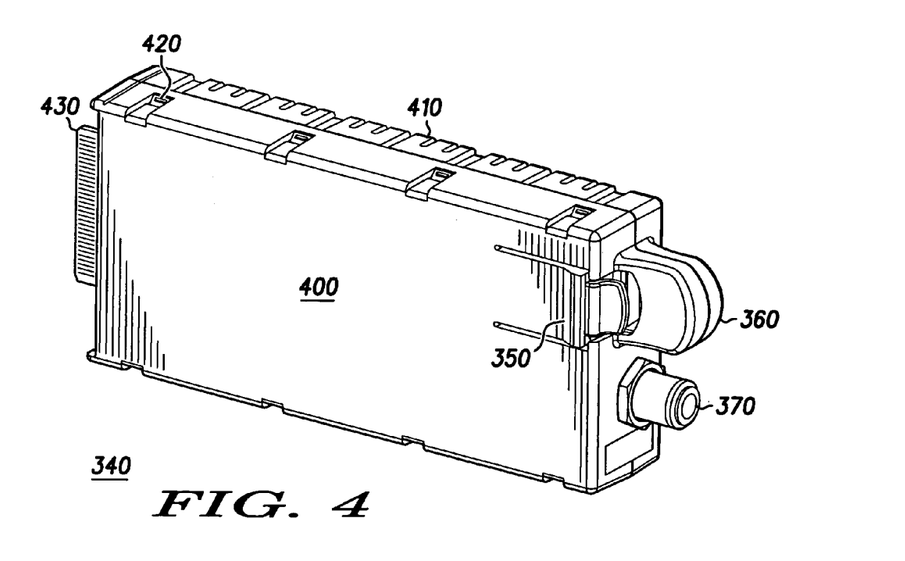
FIG. 4 is a perspective view of an upgrade tuner module, according to one exemplary embodiment.

As illustrated in FIG. 4, the removable upgrade module (340) includes a front housing member (400) and a back housing member (41) coupled together by a plurality of housing couplers (420). Additionally, as illustrated in the exemplary embodiment of FIG. 4, the handle (360) of the removable upgrade module (340) is formed in both the back housing (410) and the front housing (400). Moreover, the cantilever snap (350) is formed in the front housing (400) and forms a portion of the handle (360), as illustrated in FIG. 4. An F-connector (370) is also illustrated extruding from a first a first end of the housing of the removable upgrade module (340), while a processor interface (430) is extruding form a second end of the housing, opposite the first end.

Figure 5:
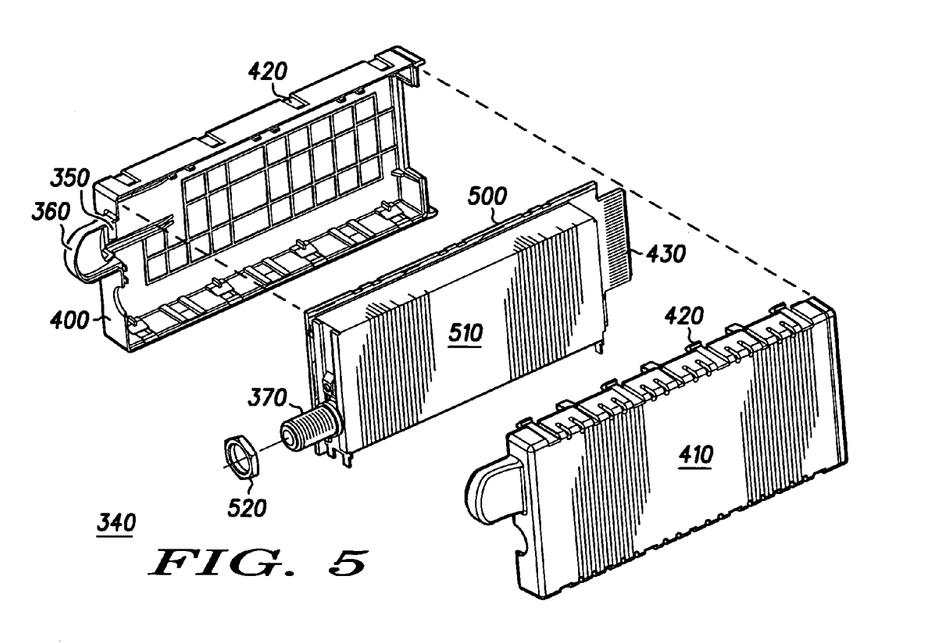
FIG. 5 is an exploded view illustrating the components of an upgrade tuner module, according to one exemplary embodiment.

FIG. 5 is an exploded view further illustrating the internal components of the removable upgrade module (340), according to one exemplary embodiment. As illustrated in FIG. 5, an upgrade tuner module (510) is disposed within the module housings (400, 410). As illustrated in FIG. 5, the upgrade tuner module (510) includes an F-connector (370)

and a processor interface (430) communicatively coupled to a tuner module printed circuit board (500).

According to the present system and method, the F-connector (370) is configured to receive an input data signal from a satellite broadcast network (120; FIG. 1). The F-connector (370) portion of the upgrade tuner module (510) is a common coaxial connector used for video applications. While the present exemplary embodiment is illustrated in the context of a tuner module printed circuit board (500) communicatively coupled to an F-connector (370), any connector used to receive data signals from a network may be used including, but in no way limited to, an s-video connector, a fiber-optic cable connector, or an RCA connector.

A tuner module printed circuit board (PCB) (500) is communicatively coupled to the F-connector (370) of the tuner module (510). According to the exemplary embodiment illustrated in FIG. 5, the tuner module PCB (500) includes circuitry configured to function as a vestigial side band (VSB)/phase shift keying (PSK) tuner module. Alternatively, the tuner module PCB (500) may be configured to decode any number of coded signals including, but in no way limited to, coded orthogonal frequency division multiplexing (COFDM) signals.

Leading from the tuner module PCB (500), a processor interface (430) is communicatively coupled to the tuner module PCB (500). According to one exemplary embodiment, the processor interface (430) is an extension of the tuner module PCB (500) having a number of leads that correspond to a module reception coupler (not shown) that is coupled to the transport processor (220; FIG. 2) disposed within the module port (330). According to this exemplary embodiment, when the processor interface (420) is inserted into the module port (330; FIG. 3) and communicatively coupled to the transport processor (220; FIG. 2) of the consumer premise component, the upgrade tuner module (400) may receive a coded audiovisual signal and demodulate that signal into a signal acceptable by the upgradeable consumer premise component (300; FIG. 3). According to one exemplary embodiment, the circuitry of the upgrade tuner module (400) also receives power through the processor interface (420).

When assembled, the tuner module (510) is disposed within the housing portion of the removable upgrade module with the F-connector (370) and the processor interface (430) each extruding from opposite ends of the housing, respectively. Once disposed within the housing, the front housing (400) and the back housing (410) may be coupled together by the housing couplers (420), thereby forming a protective housing around the tuner module (510). The housing couplers (420) used to couple the front housing (400) to the back housing (410) may be any coupling means including, but in no way limited to, male interference extrusions inserted into a female orifice. Additionally, a fastener (520) may be coupled to the F-connector (370), after the removable upgrade module (340) has been assembled, in order to further secure the position of the tuner module (510) within the front (400) and back housings (410). The fastener (520) may include, but is in no way limited to, a nut threaded onto the external threads of the F-connector (370).

Figure 6:
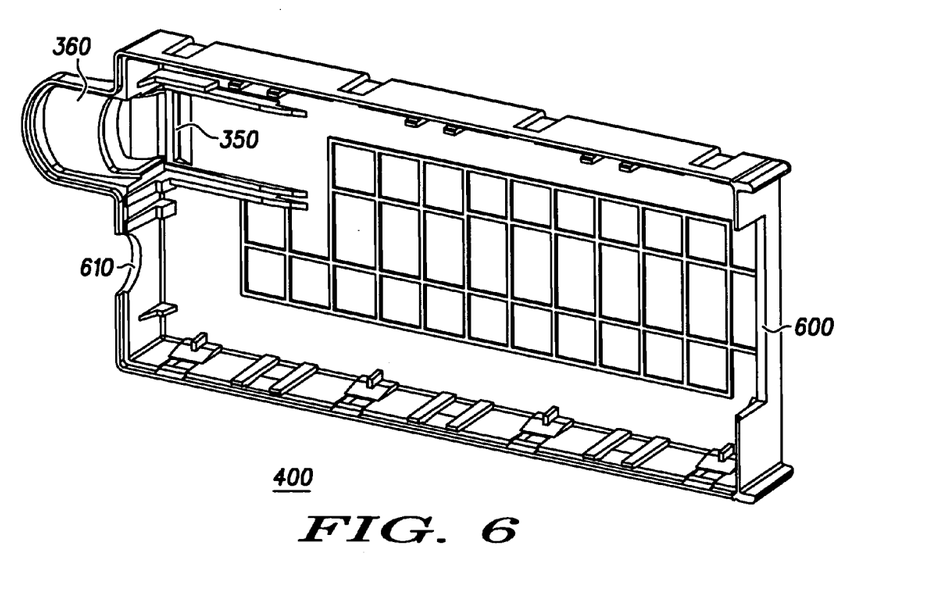
FIG. 6 is an internal view of a tuner module casing top, according to one exemplary embodiment.

FIG. 6 is a bottom view further illustrating the structure of the front housing (400), according to the exemplary embodiment shown in FIG. 4. As illustrated in FIG. 6, the front housing includes an F-connector recess (610) and an interface recess (600). The F-connector recess (610) and the interface recess (600) are withdrawn portions of the front housing (400) wall configured to form a housing orifice on the assembled housing. Additionally, FIG. 6 illustrates the cantilever snap (350) formed within the handle (360) and body portions of the front housing (400).

Figure 7:
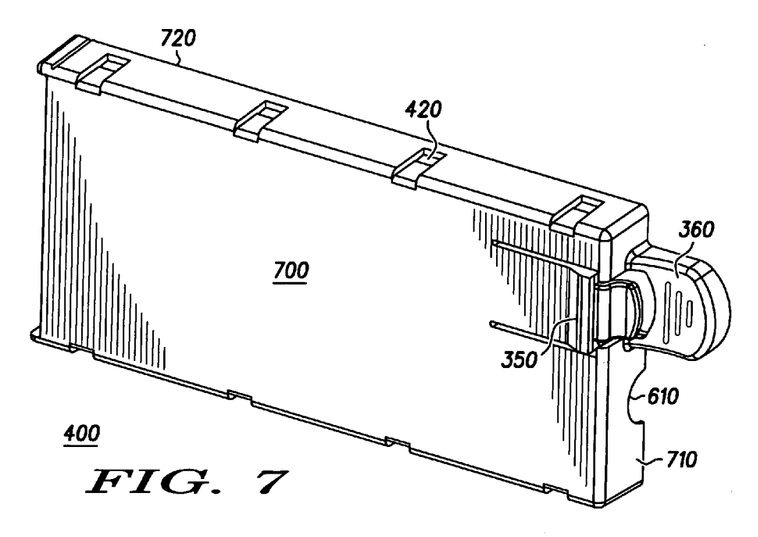
FIG. 7 is an external view of a tuner module casing top, according to one exemplary embodiment.

FIG. 7 is a top perspective view illustrating the components of the front housing (400), according to the exemplary embodiment shown in FIG. 4. As illustrated in FIG. 7, the front housing (400) includes a front surface (700), a plurality of side walls (720) and top walls (710). As illustrated in FIG. 7, the front housing (400) may include a plurality of housing couplers (420), disposed in the side wall (720) of the front housing. The housing couplers (420) disposed in the side wall (720) of the front housing (400), may be either male or female portions of a coupling pair, with the corresponding mate being formed on the back housing (410; FIG. 4).

Figure 8:
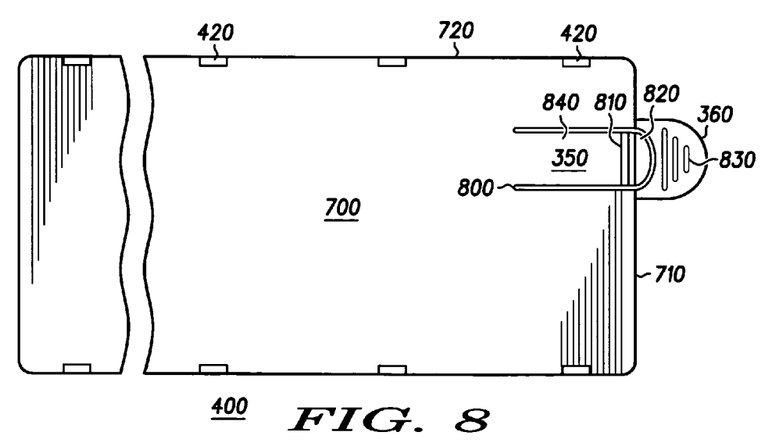
FIG. 8 is a top view illustrating a tuner module casing top having a cantilevered latch, according to one exemplary embodiment.

FIG. 8 is a top view illustrating the components of the cantilever snap (350) and the handle (360) according to one exemplary embodiment. As illustrated in FIG. 8, the present front housing (400) includes a handle (360) formed on the top wall (710) of the front hovsing (400). Additionally, a cantilever snap (350) is anchored to the front surface (700) of the front housing (400) and extends into the handle (360) of the front housing.

The handle (360) of the front housing (400) is configured to aid in the grasping and subsequent insertion and removal of the removable upgrade module (340). Consequently, a number of features of the handle (360) aid in the grasping thereof. According to one exemplary embodiment illustrated in FIG. 8, the handle (360) includes a number of ribbed friction extrusions (830). The ribbed friction extrusions (830) are configured to increase the friction experienced when a human finger grips or otherwise contacts the surface of the handle (360). Additionally, a handle lip (820) of the cantilever snap (350) is formed to extend into and follow the contours of the handle (360), thereby avoiding an obstruction to the grasping of the handle (360).

The cantilever snap (350) portion of the exemplary front housing (400) illustrated in FIG. 8 is anchored to the front surface (700) of the front housing (400) and extends into the handle portion (360). The cantilever snap (350) includes a cantilever body (840) ending with the handle lip (820). Additionally, an interference extrusion (810) is formed on the surface of the cantilever body (840). A cantilever gap (800) surrounds the cantilever snap (350), separating the cantilever snap from a majority of the front housing (400).

The cantilever snap (350) of the present system and method may be any extrusion, which is fixed at one end and free at all others. Generally, cantilevers are unable to translate or rotate at the fixed support, while the free end may do both. Consequently, both force and moment reactions may be present at the handle lip (820) portion of the present cantilever snap (350). The amount of deflection experienced by the present cantilever snap for a fixed load may be varied by varying the length of the cantilever snap (350), varying the location of the load with respect to the end of the cantilever snap, and by varying the material properties of the cantilever snap. A number of variations of the above-mentioned characteristics may be performed by the present system and method. According to one exemplary embodiment, the present cantilever snap (350) is made of plastic, having a favorable modulus of elasticity.

Figure 9:
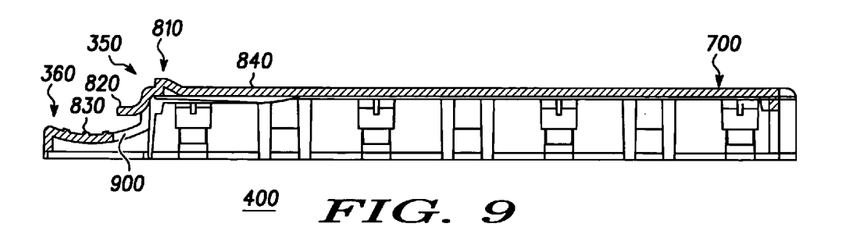
FIG. 9 is a cross-sectional side view illustrating a cantilevered latch that forms a part of the tuner module casing, according to one exemplary embodiment.

FIG. 9 is a cross sectional view further illustrating the interaction between the cantilever snap (350) and the handle (360). As illustrated in FIG. 9, a lip recess (900) is formed in the handle (360) portion of the front housing (400). The lip recess (900) is formed adjacent to the handle lip (820) portion of the cantilever snap (350) in order to permit an unobstructed deflection of the cantilever snap. As illustrated in FIG. 9, when un-deflected, the cantilever body (840) is parallel with the front surface (700) of the front housing (400). Consequently, there is no obstruction in the sliding of the removable upgrade module (340; FIG. 3) into a module port (330; FIG. 3) until the interference extrusion (810) makes contact with the CPC back plate (320; FIG. 3). However, in order to accommodate the passing of the interference extrusion (810) past the CPC back plate (320; FIG. 3), the cantilever snap (350) is deflected. The size and configuration of the lip recess (900) allows an unobstructed deflection of the cantilever snap (350).

Figure 10:
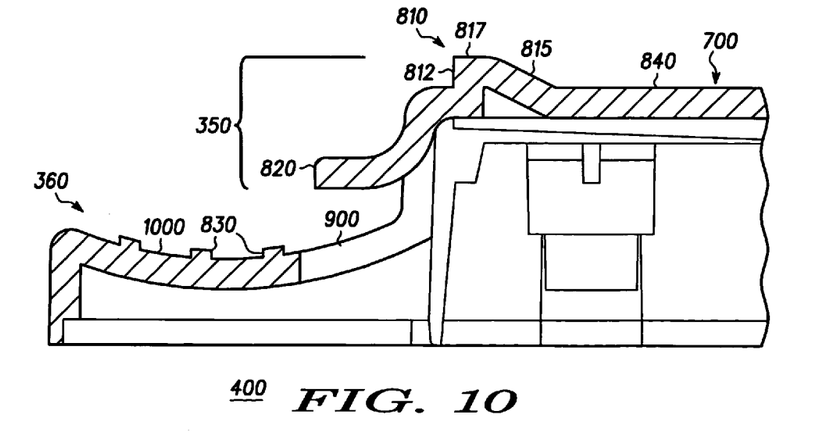
FIG. 10 is magnified cross-sectional side view illustrating a cantilevered latch that forms a part of the tuner module casing, according to one exemplary embodiment.

FIG. 10 further illustrates the individual elements of the cantilever snap that enable the present removable upgrade module (340; FIG. 3) to be engaged and remove from a CPC without the use of specialized tools. As illustrated in FIG. 10, the cantilever snap (350) includes an interference extrusion (810) configured to securely couple the removable upgrade module (340; FIG. 3) to the module port (330; FIG. 3) of an upgradeable CPC (300; FIG. 3). According to the exemplary embodiment illustrated in FIG. 10, the profile of the interference extrusion (810) includes, moving towards the handle (360) portion of the front housing (400), an interference incline (815) coupled to the cantilever body (840). A smooth transition exists between the front surface (700) of the front housing (400; FIG. 4), the cantilever body (840), and the interference incline (815). This smooth transition allows for an unhindered insertion of the removable upgrade module (340; FIG. 3). Continuing on in the same direction, the interference extrusion (810) levels off to a plateau surface (817) approximately parallel with the front surface (700) of the front housing (400; FIG. 4). After the plateau surface (817), the interference extrusion (810) angles approximately 90 degrees towards the inner portion of the front housing (400; FIG. 4). The sharp angle of the above-mentioned profile forms an interference face (812), which will securely couple the removable upgrade module (340; FIG. 3) to the module port (330; FIG. 3) of an upgradeable CPC (300; FIG. 3), as will be further described in detail below.

Continuing from the interference face (812), the cantilever snap (350) substantially follows the profile of the front housing (400; FIG. 4) until the handle lip (820) is formed. As illustrated in FIG. 10, the handle lip (820) substantially follows the curvature of the handle (360). However, as illustrated in FIG. 10, when in an un-deflected state, the handle lip (820) is somewhat removed from the lip recess (900). According to one exemplary embodiment, the distance the handle lip (820) is removed from the lip recess (900) corresponds to the height of the interference extrusion (810).

FIG. 10 also illustrates the exemplary profile of the handle portion (360) of the front housing (400; FIG. 4). According to this exemplary embodiment, the handle includes a concave body (1000) having a number of friction extrusions (830) disposed thereon. Both the concave body (1000) and the friction extrusions (830) are configured to aid in the removal and insertion of the removable upgrade module (340; FIG. 3) without specialized tools or training.

According to one exemplary embodiment of the present system and method, the present housing of the removable upgrade module (340; FIG. 3) is constructed of a non-conductive material such as plastic. According to this exemplary embodiment, manufacture of the module housing using plastic allows for less expensive and more temporally efficient manufacture through efficient plastic forming methods including, but in no way limited to, injection molding. Alternatively, the present system and method may be formed out of materials including, but in no way limited to, metals, plastics, composites, or appropriate mixtures thereof.

Exemplary Implementation and Operation

Figure 11:
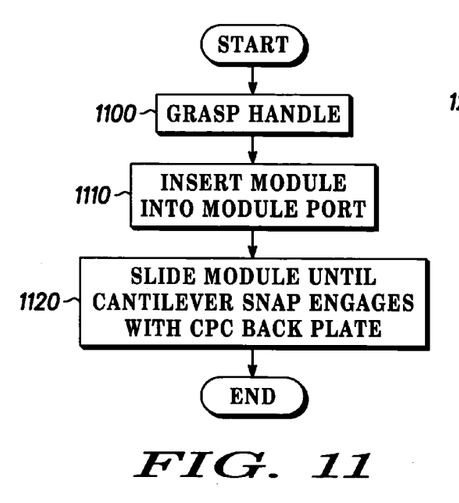
FIG. 11 is a flow chart illustrating a method for installing a tuner module, according to one exemplary embodiment.

FIG. 11 illustrates a method for installing the removable upgrade module (340; FIG. 3), according to one exemplary embodiment. As illustrated in FIG. module (step 1100) and inserting the removable upgrade module into the module port of an upgradeable CPC (step 1110). Once the module has been inserted into the module port (step 1110), the module may be slid inside the module port until the cantilever snap engages with the CPC back plate (step 1120) to end the method. Further explanation of the above-mentioned steps will now be given below.

As noted above, the present method for installing a removable upgrade decoder into an upgradeable CPC includes a user grasping the handle portion (360; FIG. 10) of the removable upgrade module (step 1100). According to the exemplary embodiment illustrated in FIG. 10, the grasping of the handle portion (360) of the removable upgrade module (340; FIG. 3) is facilitated by the shape and characteristics of the handle (360). The inclusion of the friction extrusions (830) and the concave body (1000) allow a user to securely grip the handle portion (360; FIG. 10) of the removable upgrade module (340; FIG. 3). Additionally, the shape of the cantilever snap (350) prevents any obstruction of the handle portion (360; FIG. 10).

Once the handle portion (360) of the removable upgrade module (340; FIG. 3) is grasped by a user, it may be inserted into the module port (330; FIG. 3) of an upgradeable CPC (300; FIG. 3). According to one exemplary embodiment illustrated in FIG. 3, the module port (330) is configured to accept the removable module (340) without permitting lateral movement of the removable module. That is, a number of guides or other structural elements may be included in the module port (330) to assure the processor interface (430; FIG. 4) of the removable module (340) is translated directly to an interface receiving port (not shown) that is communicatively coupled to the transport processor (220; FIG. 2). According to this exemplary embodiment, the removable module (340) is inserted by leading the processor interface (430; FIG. 4) into the module port (330).

Once inserted, the removable upgrade module (340) is slid, being guided by the guides or other structural elements, until the processor interface (430; FIG. 4) of the removable module (340) is translated to an interface receiving port (step 1120; FIG. 11). According to this exemplary embodiment, when the removable upgrade module (340) is sufficiently inserted into the module port (330) to communicatively couple the processor interface (430; FIG. 4), the cantilever snap (350; FIG. 3) engages the CPC back plate (320), thereby securely coupling the removable upgrade module (340; FIG. 3) to the upgradeable CPC (300).

Figure 13:
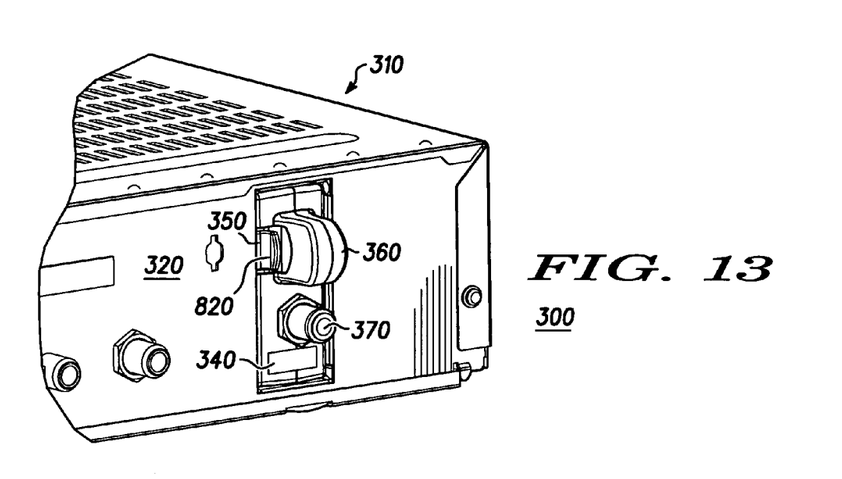
FIG. 13 is a perspective view illustrating an installed upgrade tuner module, according to one exemplary embodiment.

FIG. 13 illustrates a removable upgrade module (340) securely coupled to an upgradeable CPC (300). As illustrated in FIG. 13, an engaged removable upgrade module (340) is slid into the module port (330; FIG. 3) sufficiently to engage the cantilever snap (350) with the CPC back plate (320). According to one exemplary embodiment, as the removable upgrade module (340) is translated into the module port (330; FIG. 3), the edge of the CPC back plate (320) contacts the front surface (700) of the removable upgrade module housing. Sufficient space exists between the CPC back plate (320) and the removable upgrade module (340) to permit substantially unrestrained insertion of the module. However, once the cantilever snap (350) contacts the CPC back plate (320), a deflection of the cantilever snap may occur. As the interference incline (815; FIG. 8) contacts the CPC back plate (320), further translation of the module forces the cantilever snap towards the center of the housing, until the plateau (817; FIG. 8) portion of the interference extrusion (810; FIG. 8) is substantially flush with the front surface (700; FIG. 8). As the interference extrusion (810; FIG. 8) is further translated past the CPC back plate (320), the cantilever snap (350) is permitted to return to its original position. As a result, the interference face (812; FIG. 8) forms an interference fit with the inner surface of the CPC back plate (320). Consequently, the present removable upgrade module remains securely coupled to the upgradeable CPC (300).

Figure 12:
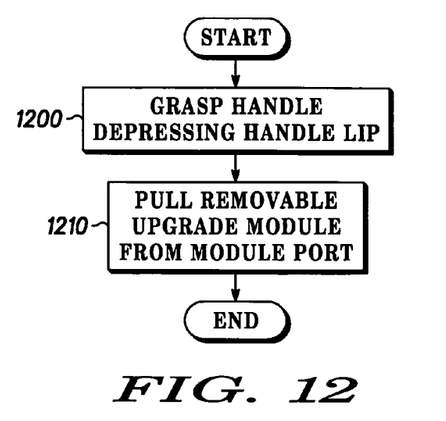
FIG. 12 is a flow chart illustrating a method for removing a tuner module, according to one exemplary embodiment.

FIG. 12 illustrates a method for removing the present removable upgrade module (340), according to one exemplary embodiment. As illustrated in FIG. 12 the method starts with, the removable upgrade module may be removed by grasping the handle while simultaneously depressing the cantilever snap (step 1200). As the handle lip (820; FIG. 8) portion of the cantilever snap is depressed, the cantilever snap (350; FIG. 8) is deflected at least until the plateau (817; FIG. 8) of the interference extrusion (810; FIG. 8) is in line with the front surface (700) of the module housing, thereby removing any interference between the module and the CPC backplate (320).

Once the cantilever snap is grasped and sufficiently deflected, the user may then pull the removable upgrade module from the module port (step 1210) to end the method. Sufficient deflection of the handle lip (820; FIG. 8), and consequently the interference extrusion, will eliminate the interference with the CPC back plate (320; FIG. 13). A pull by the user while grasping the handle portion (360; FIG. 3) of the removable upgrade module (340; FIG. 13) will remove the module from the upgradeable CPC (300; FIG. 13).

In conclusion, the present system and method for forming a user installable/removable tuner module simplifies the installation of an upgrade tuner module while reducing module production costs. More specifically, a consumer operable plastic cantilever snap and handle are molded into a plastic housing that surrounds a printed wiring assembly (PWA). The cantilever snap retains and disengages the module while the handle aids in the grasping of the module for insertion and removal. The use of the above plastic cantilever snap and handle eliminate the use of extra hardware to retain the module. This elimination of extra hardware reduces storage costs, inventory costs, and manufacturing labor when compared to traditional methods. Additionally, the present system and method is easy to use, thereby reducing installation time while eliminating the need for a complicated consumer installation, which could include a need for extra tools, a consumer loosing hardware, or a consumer damaging the module during installation.

The preceding description has been presented only to illustrate and describe the present system and method. It is not intended to be exhaustive or to limit the present system and method to any precise form disclosed. Many modifications and variations are possible in light of the above teachings. For example, a cantilever snap may be formed on either or both the front and the back housing of the present removable upgrade module. Additionally, any number of materials may be used to form the present module.

The foregoing embodiments were chosen and described in order to illustrate principles of the system and method as well as some practical applications. The preceding description enables others skilled in the art to utilize the system and method in various embodiments and with various modifications as are suited to the particular use contemplated. It is intended that the scope of the system and method be defined by the following claims.

What is claimed is:

1. A removable radio frequency (RF) tuner comprising:
a housing;
a cantilever snap in said housing, said cantilever snap being configured to securely couple said housing to a consumer premise component, wherein the cantilever snap further comprises;
 a body, said body being securely coupled to said housing at a first end of said body; and
 an interference extrusion on a second end of said body, wherein the interference extrusion further comprises;
  a gradual incline on a first side of said interference extrusion;
  a plateau on a top of said interference extrusion;
  an interference face disposed on a second side of said interference extrusion; and
  wherein said interference face is configured as an interference fit with a planar surface; and
a handle formed on said housing.

2. The removable RF tuner of claim 1, further comprising:
a printed circuit board disposed in said housing;
wherein said printed circuit board is configured to receive and decode radiofrequency signals.

3. The removable RF tuner of claim 2, further comprising:
an F-connector communicatively coupled to a first end of said printed circuit board; and
a processor interface communicatively coupled to a second end of said printed circuit board.

4. The removable RF tuner of claim 2, wherein said printed circuit board is configured to function as a vestigial side band (VSB) or phase shift keying (PSK) tuner module.

5. The removable RF tuner of claim 1, wherein said removable RF tuner is configured to be communicatively coupled to a consumer premise component.

6. The removable RF tuner of claim 1, further comprising:
a lip recess disposed in said handle;
said lip recess being configured to permit an unobstructed deflection of said cantilever snap into said handle.

7. The removable RF tuner of claim 1, wherein said handle further comprises a concave body, said concave body including a plurality of friction extrusions disposed on said concave body.

8. The removable RF tuner of claim 1, wherein said housing further comprises:
an F-connector orifice disposed in a first end of said housing; and
a processor interface orifice disposed in a second end of said housing.

9. The removable RF tuner of claim 1, wherein said housing comprises plastic.

10. The removable RF tuner of claim 9, wherein said housing is formed by an injection molding method.

11. The removable RF tuner of claim 1, wherein:
said cantilever snap is fixed at a first end to said housing; and
said body extrudes into said handle at a second end of said cantilever snap.

12. The removable RF tuner of claim 11, wherein said second end substantially follows a profile of said handle.

13. A consumer premise component (CPC) comprising:
a body;
a module port in said body; and a removable radio frequency (RF) tuner configured to be securely coupled to said module port, said removable RF tuner including;
a housing,
a cantilever snap in said housing, said cantilever snap being configured to securely couple said housing to said body, wherein the cantilever snap comprises;
a member, said member being securely coupled to said housing at a first end of said member; and
an interference extrusion on a second end of said member,
and a handle on an edge of said housing.

14. The CPC of claim 13, further comprising:
a printed circuit board disposed in said housing;
wherein said printed circuit board is configured to receive and decode radiofrequency signals.

15. The CPC of claim 13, wherein said interference extrusion comprises:
a gradual incline on a first side of said interference extrusion;
a plateau on a top of said interference extrusion; and
an interference face disposed on a second side of said interference extrusion;
said interference face being configured as an interference fit with a planar surface of said housing.

16. The CPC of claim 15, wherein:
said member is fixed at a first end to said housing; and
said member extrudes into said handle at a second end.

17. The CPC of claim 13, further comprising:
a lip recess disposed in said handle;
said lip recess being configured to permit an unobstructed deflection of said cantilever snap into said handle.

18. The CPC of claim 13, wherein said housing comprises plastic.

19. The CPC of claim 18, wherein said housing is formed by an injection molding method.

20. A removable radio frequency (RF) tuner comprising:
a protective means for housing electrical components;
a cantilevered means for securing said protective means to a consumer premise component housing, wherein the cantilever means comprises;
a body, said body being securely coupled to said protective means at a first end of said body; and
an interference extrusion on a second end of said body, wherein the interference extrusion comprises;
a gradual incline an a first side of said interference extrusion;
a plateau on a top of said interference extrusion; and
an interference face disposed on a second side of said interference extrusion, wherein the interference face is configured as an interference fit with the consumer premise component housing, and
a means for pulling said protective means, said pulling means being on an edge of said protective means.

21. The removable RF tuner of claim 20, further comprising:
a printed circuit board disposed in said protective means;
said printed circuit board being configured to receive and decode radiofrequency signals.

22. The removable RF tuner of claim 21, wherein said printed circuit board is configured to function as a vestigial side band (VSB) or phase shift keying (PSK) tuner module.

23. The removable RF tuner of claim 20, wherein said protective means comprises plastic; and
said protective means for housing being formed by an injection molding method.

24. The removable RF tuner of claim 20, wherein:
said cantilevered means is fixed at a first end to said consumer premise component housing; and
said body extrudes into said means for pulling at a second end.

25. The removable RF tuner of claim 20, wherein said means for pulling further comprises an extrusion from said protective means, said extrusion including a concave body including a plurality of friction extrusions disposed on said concave body.

* * * * *